(12) United States Patent
Burke

(10) Patent No.: US 11,435,990 B2
(45) Date of Patent: Sep. 6, 2022

(54) METHODS AND APPARATUS FOR MALWARE DETECTION USING JAR FILE DECOMPILATION

(71) Applicant: McAfee, LLC, Santa Clara, CA (US)

(72) Inventor: Daniel Burke, Hillsboro, OR (US)

(73) Assignee: MCAFEE, LLC, San Jose, CA (US)

( * ) Notice: Subject to any disclaimer, the term of this patent is extended or adjusted under 35 U.S.C. 154(b) by 472 days.

(21) Appl. No.: 16/540,927

(22) Filed: Aug. 14, 2019

(65) Prior Publication Data

US 2021/0048993 A1    Feb. 18, 2021

(51) Int. Cl.
*G06F 8/53* (2018.01)
*G06N 20/00* (2019.01)
*G06F 21/56* (2013.01)

(52) U.S. Cl.
CPC .............. *G06F 8/53* (2013.01); *G06F 21/565* (2013.01); *G06N 20/00* (2019.01); *G06F 2221/033* (2013.01)

(58) Field of Classification Search
CPC ....................................................... G06F 8/53
See application file for complete search history.

(56) References Cited

U.S. PATENT DOCUMENTS

| | | |
|---|---|---|
| 8,806,641 B1 | 8/2014 | Li et al. |
| 11,023,580 B1 * | 6/2021 | Han ...................... G06F 21/562 |
| 2012/0317644 A1 * | 12/2012 | Kumar .................. G06F 21/566 726/24 |
| 2017/0091654 A1 * | 3/2017 | Singh ..................... G06N 20/00 |
| 2018/0053002 A1 * | 2/2018 | El-Moussa .............. H04L 67/10 |
| 2018/0060575 A1 * | 3/2018 | El-Moussa .......... H04L 63/1441 |

FOREIGN PATENT DOCUMENTS

| | | |
|---|---|---|
| CN | 106778266 | 5/2017 |
| CN | 107958154 | 4/2018 |
| EP | 2808790 | 12/2014 |

OTHER PUBLICATIONS

International Searching Authority, "International Search Report and Written Opinion," issued in connection with PCT patent application No. PCT/US2020/046190, dated Oct. 20, 2020, 12 pages.

* cited by examiner

*Primary Examiner* — Simon P Kanaan
(74) *Attorney, Agent, or Firm* — Hanley, Flight & Zimmerman, LLC

(57) ABSTRACT

The methods and apparatus for detecting malware using JAR file decompilation are disclosed. An apparatus for decompiling class files, the apparatus comprising a class feature unpacker to unpack a class feature from a class file included in an instruction set, a constant pool address generator to generate a constant pool address table, from the class features, including a plurality of constant pool blocks, based on constant pool type, through an iterative process, a class feature identifier to determine values for each constant pool block based on a constant pool type and store the determined values as a class file feature set, a feature value identifier to obtain raw feature values from a class file feature set and non-class file features, and a feature matrix generator to generate a matrix based on the raw features that correspond to the instruction set.

20 Claims, 8 Drawing Sheets

METHODS AND APPARATUS FOR MALWARE DETECTION USING JAR FILE DECOMPILATION

FIELD OF THE DISCLOSURE

This disclosure relates generally to file decompilation, and, more particularly, to methods and apparatus for malware detection using Java ARchive (JAR)/class file decompilation.

BACKGROUND

In recent years, malware detection of JAR/class files, that have not yet been cataloged, require the extraction of key features to be analyzed. Decompilation of these files is needed to obtain the data for some of the features included in those files, but current methods are too slow for real-time use. These features are useful in the development of malicious machine learning models that allow for static detection of JAR/class files in real-time.

Figure 1:
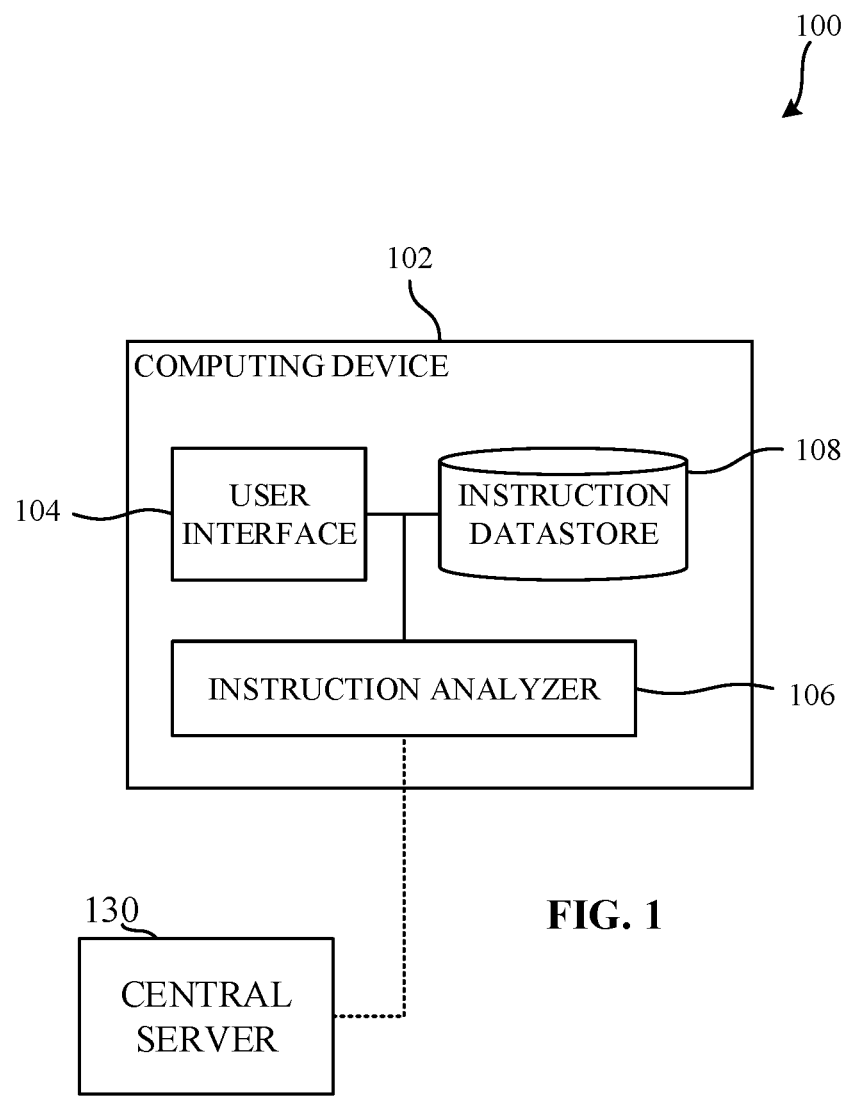
FIG. 1 is a schematic illustration of an example system constructed in accordance with teachings of this disclosure for JAR/class file decompilation.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

When attempting to use machine learning models to classify instructions (e.g., JAR files, class files, etc.), a blocking issue for performing such classification in real-time is that decompilation is often necessary. However, decompilation of instructions can be a slow process that prevents malware tools from being used in real-time. Example methods and apparatus disclosed herein seek to use partial decompilation of instructions to extract the features as input(s) for use with a malware detection model. The example partial decompilation methods and apparatus can be used in the context of a machine learning model used to classify and detect malicious instructions. This process is orders of magnitude faster than previously available tools and enables real-time identification of malicious instructions.

Java Archive files, or JAR files, are used to aggregate files, such as class and non-class files, into one location for application software distribution and/or library distribution on the Java platform. These JAR files are compressed versions of class files, audio files, text files, image files, directories, etc. and can be used for tasks such as lossless data compression, archiving, decompression, and archive unpacking. In examples disclosed herein, a class file is a component of a JAR file that represents a class. In examples disclosed herein, a non-class file is a component of a JAR file that is not a class file.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models, machine learning algorithms, and/or machine learning architectures exist. In examples disclosed herein, a Neural Network machine learning architecture is used. In general, machine learning models/algorithms/architectures that are suitable to use in the example approaches disclosed herein will enable classification of inputs belonging to a particular class (e.g., malicious or benign). However, any other past, present, and/or future types of machine learning models/algorithms/architectures could additionally or alternatively be used such as, for example, a decision tree architecture, a tree hybrid/ensemble architecture, a Gradient Boosted Tree architecture, a Random Forest architecture, a Logistic Regression architecture, a Support Vector Machine (SVM) architecture, a convolutional Neural Network (NN) architecture.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. In examples disclosed herein, the training data originates from locally generated data. Because supervised training is used, the training data is labeled. Labeling is applied to the training data by machine learning model users once the data has been scanned for malware using preexisting malware detectors.

Once training is complete, the model is deployed for use as an executable construct that processes an input and provides an output based on the network of nodes and connections defined in the model. The model may then be executed to classify an instruction (e.g., as malicious or benign).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of an example system 100 constructed in accordance with teachings of this disclosure for instruction decompilation. The example system 100 of FIG. 1 includes a computing device 102, a user interface 104, an instruction analyzer 106, an instruction datastore 108, and a central server 130.

The example computing device 102 is any computing device, that can include but is not limited to, a desktop, a laptop, a tablet, a smart phone, etc. that executes instructions. The example computing device 102 includes a user interface 104, an instruction analyzer 106, and an instruction datastore 108.

The example user interface 104 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The user interface 104 enables the instruction analyzer 106 to prompt a user when a malicious file is detected and allows the user to determine the instructions that need to be analyzed by the instruction analyzer 106.

The example instruction analyzer 106 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. the instruction analyzer 106 decompiles selected instructions to be analyzed for malicious content. The instruction analyzer 106 may be prompted by a user through the user interface 104 to initialize the decompilation and analysis process of the instructions and may also output results to the user through the user interface 104.

The example instruction datastore 108 is implemented by any memory, storage device and/or storage disc for storing data such as, for example, flash memory, magnetic media, optical media, solid state memory, hard drive(s), thumb drive(s), etc. Furthermore, the data stored in the example instruction datastore 108 may be in any data format such as, for example, binary data, comma delimited data, tab delimited data, structured query language (SQL) structures, etc. While, in the illustrated example, the instruction datastore 108 is illustrated as a single device, the example instruction datastore 108 and/or any other data storage devices described herein may be implemented by any number and/or type(s) of memories. The example instruction datastore enables storage of instructions and any corresponding instruction features, values, and/or identifiers. The example instruction datastore may, in some examples, store machine learning model training and processing data and/or instructions.

The example central server 130 is a server that communicates via a network such as, for example, the Internet, to provide instructions that may be executed at the computing device 102. That is, the example central server 130 provides instructions for implementing the instruction analyzer 106 of the computing device 102 to enable the computing device to analyze instructions stored in the instruction datastore 108. In examples disclosed herein, the instructions provided to the computing device 102 are executable instructions that may be directly executed at the computing device 102. However, in some examples, the instructions are provided as part of a software development kit (SDK), application programming interface (API) to an intermediary party (e.g., a manufacturer, an app developer) to enable the intermediary party to create (e.g., design, develop, compile, etc.) executable instructions (e.g., an application, firmware, etc.) to be executed at the computing device 102. In some examples, machine learning models may be provided from the central server 130 to the instruction analyzer 106.

Figure 2:
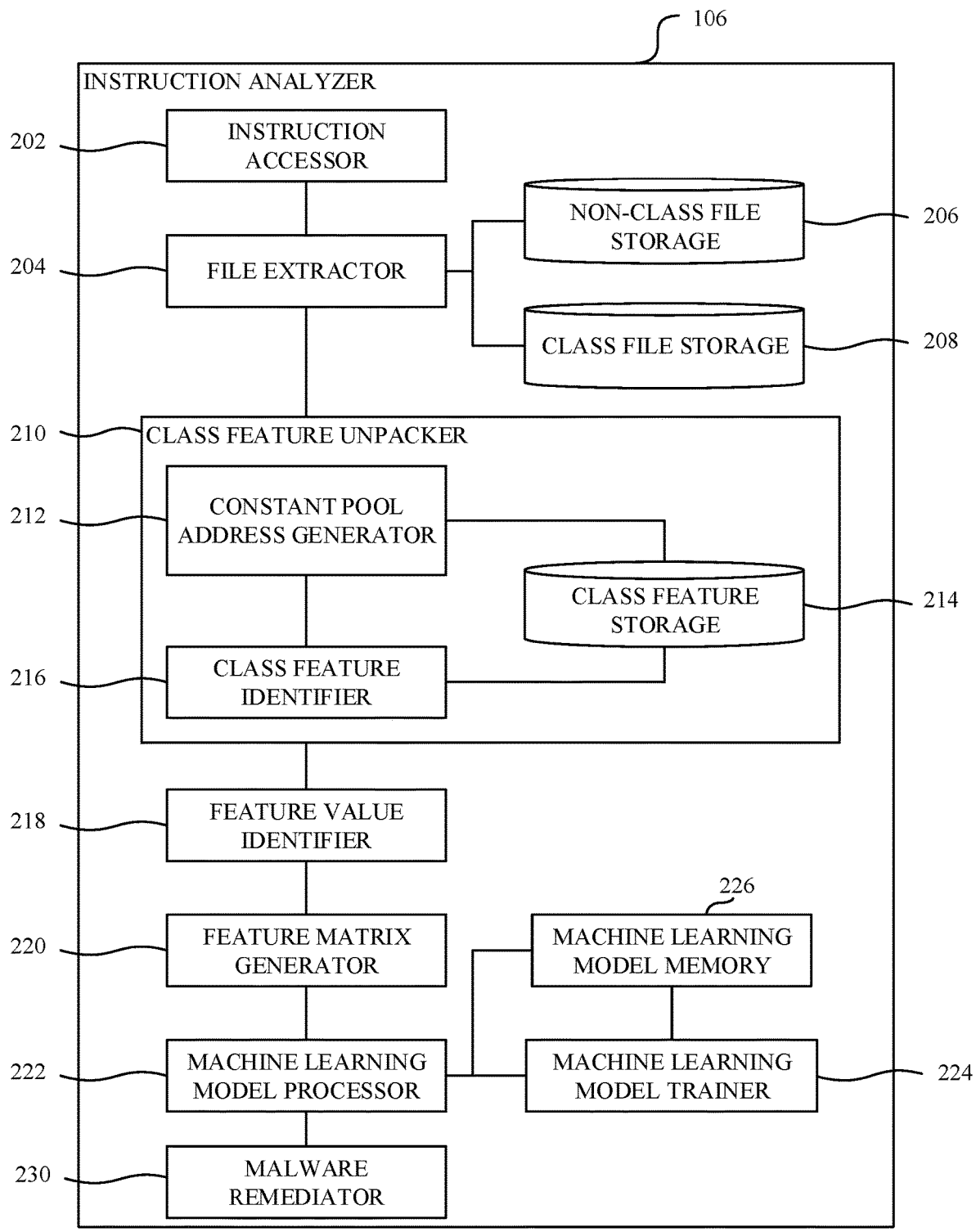
FIG. 2 is a block diagram representing an example system for analyzing and decompiling JAR/class files.

FIG. 2 is a block diagram representing an example system for analyzing and decompiling instruction files. The example instruction analyzer 106 of FIG. 2 includes an instruction accessor 202, a file extractor 204, a non-class file storage device 206, a class file storage device 208, a class feature unpacker 210, a constant pool address generator 212, a class feature storage device 214, a class feature identifier 216, a feature value identifier 218, a feature matrix generator 220, a machine learning model processor 222, a machine learning model trainer 224, a machine learning model memory 226, and a malware remediator 230.

The instruction accessor 202 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The instruction accessor 202 may implement a means for accessing instruction files, or any other related file and/or document, from another data sending or data storage device.

The file extractor 204 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The file extractor 204 of FIG. 2 extracts instructions, or any other related file and/or document, once they are received by the instruction accessor 202. The file extractor 204 may implement a means for extracting the class and non-class files from the instructions.

The non-class file storage device 206 and the class file storage device 208 of FIG. 2 are implemented by any memory, storage device and/or storage disc for storing data such as, for example, flash memory, magnetic media, optical media, solid state memory, hard drive(s), thumb drive(s), etc. Furthermore, the data stored in the example non-class file storage device 206 and class file storage device 208 may be in any data format such as, for example, binary data, comma delimited data, tab delimited data, structured query language (SQL) structures, etc. While, in the illustrated example, the example non-class file storage device 206 and class file storage device 208 are illustrated as single devices, the example non-class file storage device 206 and the example class file storage device 208 and/or any other data storage devices described herein may be implemented by any number and/or type(s) of memories. The non-class file storage device 206 may implement the means for storing non-class file features extracted from the instruction set by the file extractor 204. The class file storage device 208 may implement the means for storing class files extracted from the instruction set by the file extractor 204. In examples disclosed herein, the non-class file storage device 206 stores the non-class file features that are extracted via the file extractor 204 and the class file storage device 208 stores the class files that are extracted via the file extractor 204.

The class feature unpacker 210 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The class feature unpacker 210 may implement a means for unpacking a class feature from a class file included in an instruction set. Unpacking class features may additionally or alternatively be implemented by block 310 of FIG. 3 and includes the constant pool address generator 212 and the class feature identifier 216.

The constant pool address generator 212 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The example constant pool address generator 212 may implement means for generating a constant pool address table, from the class features, including a plurality of constant pool blocks, based on constant pool types, through an iterative process.

The class feature identifier 216 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The class feature identifier 216 may implement a means for determining values for each constant pool block based on a constant pool type and storing the determined values as a class file feature set.

In examples disclosed herein, the class feature identifier 216 processes each constant pool block, from the constant pool address table, based on constant pool type. Constant pool types include, but are not limited to, class, string, method reference, dynamic invocation, and/or other constant pool address types. Processed constant pool type blocks are obtained and values are added such as, for example, class names, strings, Java identifiers, and/or any other programmable language identifier(s). Constant pool blocks are processed in a way to remove unnecessary elements, store relevant bits of information, account for Java decoration, and/or any other method to make processing more efficient.

The feature value identifier 218 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The feature value identifier 218 may implement a means for obtaining raw feature values from a class file feature set and non-class file features. The feature value identifier 218 obtains (e.g., extracts) the raw feature values from the class file feature sets and mines feature values from those class file feature sets. This includes obtaining raw features from the non-class file features previously extracted by the file extractor 204. The means for obtaining feature values from raw features may additionally or alternatively be implemented by block 312 of FIG. 3.

The feature matrix generator 220 of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The feature matrix generator 220 may implement a means for generating a matrix based on the obtained raw features that correspond to the instruction set. The means for generating the feature matrix may additionally or alternatively be implemented by block 314 of FIG. 3.

The example machine learning model processor 222 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The machine learning model processor 222 applies a machine learning model to decompiled instructions for malware analysis. The machine learning model processor 222 may implement the means for applying the machine learning model to the matrix to determine whether a second JAR file is malicious. In this example, the machine learning model is applied to the generated feature matrix created by the feature matrix generator 220. The machine learning model processor 222 analyzes the matrix and determines scores based on matrix values that correspond to selected instructions. The scores are compared with threshold(s), that are determined by the machine learning model trainer 224 before the model is applied and the instructions are returned to the user through the user interface 104 as either malicious, benign, or unknown. The machine learning model may additionally or alternatively be implemented by the instructions represented by the flowchart of FIG. 6.

The example machine learning model trainer 224 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s) DSP(s), etc. The machine learning model trainer 224 trains a machine learning model based on labeled inputs that have expected, or known, outputs. The machine learning model trainer 224 may implement the means for training the machine learning model based on generated matrices and a threshold value. In examples disclosed herein, labeled instructions are used during the machine learning model training phase. The labeled instructions are analyzed by the instruction analyzer 106 and threshold values are determined based on the comparison of the input instructions to the output classifications (e.g., malicious, benign, or unknown). Training may additionally or alternatively be implemented by block 700 of FIG. 6. In examples disclosed herein, training is performed using stochastic gradient descent. However, any other approach to training a machine learning model may additionally or alternatively be used.

The example machine learning model memory 226 of the illustrated example of FIG. 2 is implemented by any memory, storage device, and/or storage disc for storing data such as, for example, flash memory, magnetic media, optical media, solid state memory, hard drive(s), thumb drive(s), etc. Furthermore, the data stored in the example machine learning model memory 226 may be in any data format such as, for example, binary data, comma delimited data, tab delimited data, structured query language (SQL) structures, etc. While, in the illustrated example, the machine learning model memory 226 is illustrated as a single device, the example machine learning model memory 226 and/or any other data storage devices described herein may be implemented by any number and/or type(s) of memories. In the illustrated example of FIG. 2, the example machine learning model memory 226 stores one or more machine learning models that enable the machine learning model processor 222 to process input an input feature matrix to classify instructions associated with the feature matrix as benign or malicious.

The malware remediator 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example malware remediator 230, in response to detection of malware, performs a responsive action. The responsive action may include, for example, deleting the data identified to be malware, quarantining the data (e.g., preventing execution of the data), alerting a user, alerting a system administrator, etc.

While an example manner of implementing the instruction analyzer 106 of FIG. 1 is illustrated in FIG. 2, one or more of the elements, processes and/or devices illustrated in FIG. 2 may be combined, divided, re-arranged, omitted, eliminated and/or implemented in any other way. Further, the example instruction accessor 202, the example file extractor 204, the example class feature unpacker 210, the example constant pool address generator 212, the example class feature identifier 216, the example feature value identifier 218, the example feature matrix generator 220, the example machine learning model processor 222, the example machine learning model trainer 224, the example malware remediator 230, and/or, more generally, the example instruction analyzer 106 of FIG. 2 may be implemented by hardware, software, firmware and/or any combination of hardware, software and/or firmware. Thus, for example, any of the example instruction accessor 202, the example file extractor 204, the example class feature unpacker 210, the example constant pool address generator 212, the example class feature identifier 216, the example feature value identifier 218, the example feature matrix generator 220, the example machine learning model processor 222, the example machine learning model trainer 224, the example malware remediator 230, and/or, more generally, the example instruction analyzer 106 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, instruction accessor 202, the example file extractor 204, the example class feature unpacker 210, the example constant pool address generator 212, the example class feature identifier 216, the example feature value identifier 218, the example feature matrix generator 220, the example machine learning model processor 222, the example machine learning model trainer 224, the example malware remediator 230, and/or, more generally, the example instruction analyzer 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example instruction analyzer 106 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the instruction analyzer 106 of FIGS. 1 and/or 2 are shown in FIGS. 3, 4, 5, 6 and/or 7. The machine-readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 3, 4, 5, 6 and/or 7, many other methods of implementing the example instruction analyzer 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 5, 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
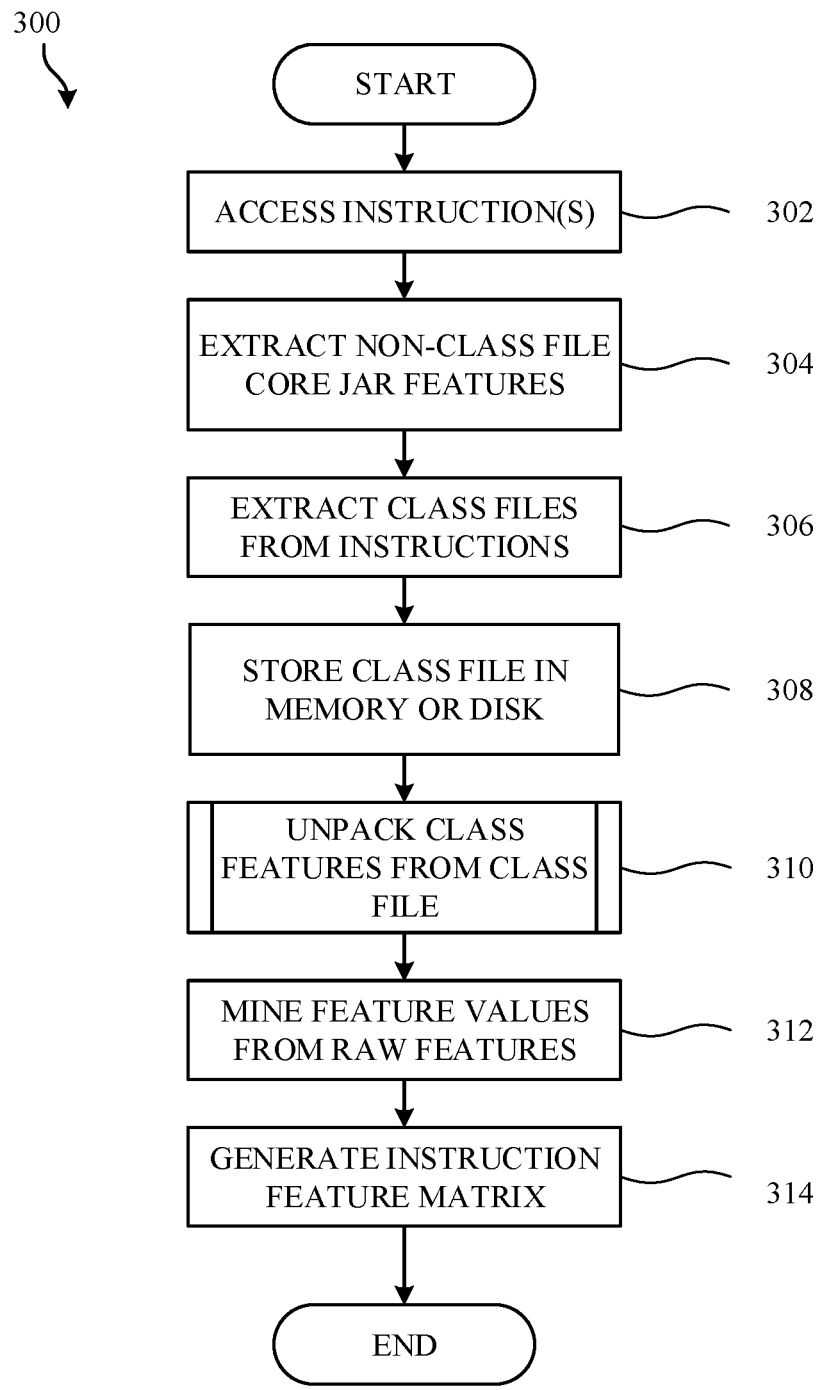
FIG. 3 is a flowchart representative of example machine-readable instructions which may be executed to implement the example instruction analyzer of FIG. 2.

FIG. 3 is a flowchart representative of machine-readable instructions which may be executed to implement the example instruction analyzer 106 of FIG. 2. The example process 300 of FIG. 3 begins when the instruction accessor 202 is initialized and an instruction is accessed. (Block 302). Such initialization may occur, for example, at the direction of a user, at the startup of the computing device 102, as part of a file system scan, when instructions are not functioning properly, when new instructions are installed and/or downloaded, etc.

The file extractor 204 extracts the non-class, core features from the instructions. (Block 304). These features include, but are not limited to, for example, signature status, access flags, mime types, etc. The extracted features are stored in the non-class file storage device 206 to later be accessed when generating the final instruction feature matrix. (Block 314).

The class files from the instructions are extracted by the file extractor 204. (Block 306). The class files are stored in the class file storage 208, which can be an internal or external memory such as a hard drive, disk, etc. (Block 308).

The class feature unpacker 210 unpacks the class file features that include, but are not limited to, file size, valid starting block data, and/or other extractable instruction features and is described below in connection with the illustrated flowchart of FIG. 4. (Block 310). The class feature unpacker 210 contains the constant pool address generator 212 and the class feature identifier 216 and stores the processed class file features as class file feature sets.

The feature value identifier 218 mines, or processes, the class file feature sets for the raw feature values. (Block 312). The feature matrix generator 220 generates a matrix from the raw feature values, that were extracted from the class and non-class files, corresponding to the accessed instruction. (Block 314).

Figure 4:
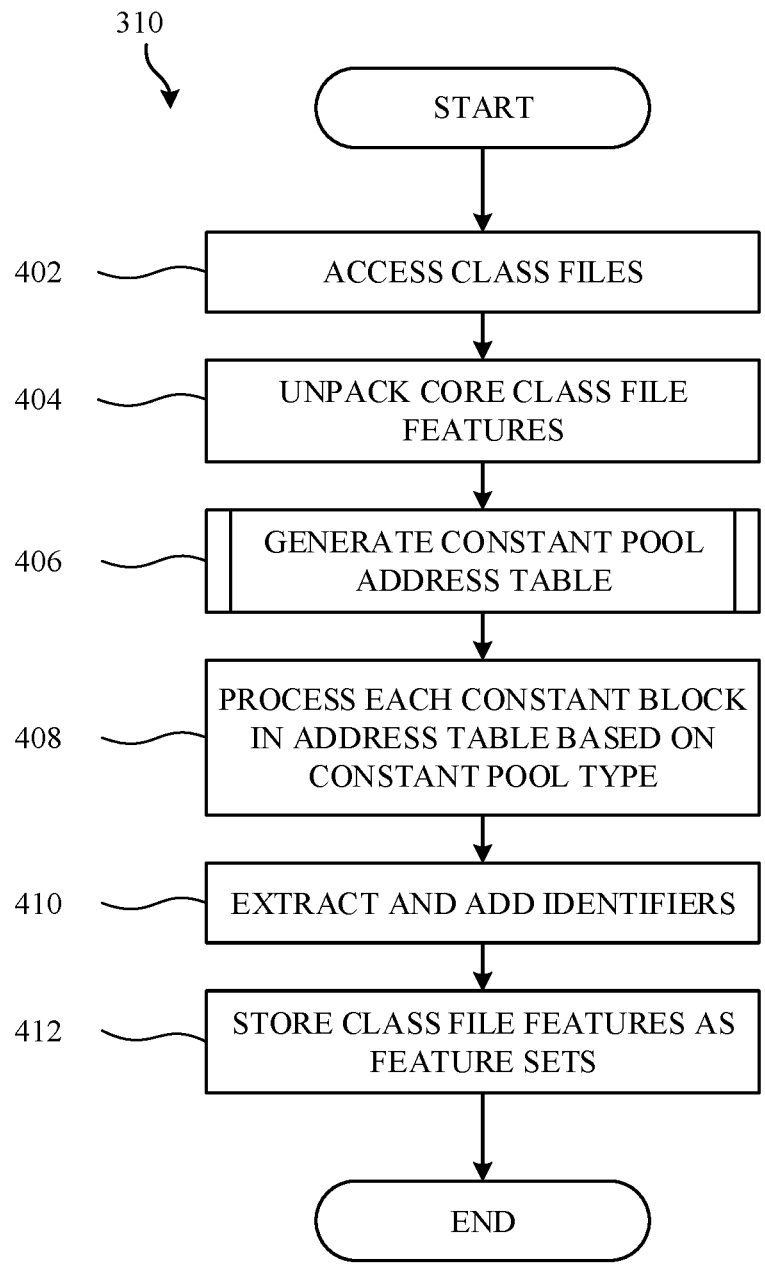
FIG. 4 is a flowchart representative of example machine-readable instructions which may be executed to implement the example instruction analyzer of FIG. 2 to unpack class features from class files.

FIG. 4 is a flowchart representative of example machine readable instructions which may be executed to implement the example instruction analyzer 106 of FIG. 2 to unpack class file features from class files and store them as class file feature sets. The example process 310 of the illustrated example of FIG. 4 begins when the class files from the class file storage 208 are accessed by the class feature unpacker 210. (Block 402). The class feature unpacker 210 unpacks the key class file features. (Block 404). The constant pool address generator 212 takes the key class file features and uses an iterative process, described below in connection with the illustrated example of FIG. 5, to divide and/or group the class file features into constant blocks based on their constant block type. (Block 406).

The class feature identifier 216 processes the newly formed constant blocks for each constant pool type. (Block 408). The blocks are obtained by the class feature identifier 216 and values are added such as, for example, class names, strings, Java identifiers, and/or any other programmable language identifier(s). (Block 410). The class feature identifier 216 stores the processed class file feature values in the class feature storage 214 as sets to prevent duplicate entries and/or any other reason to make processing more efficient. (Block 412).

Figure 5:
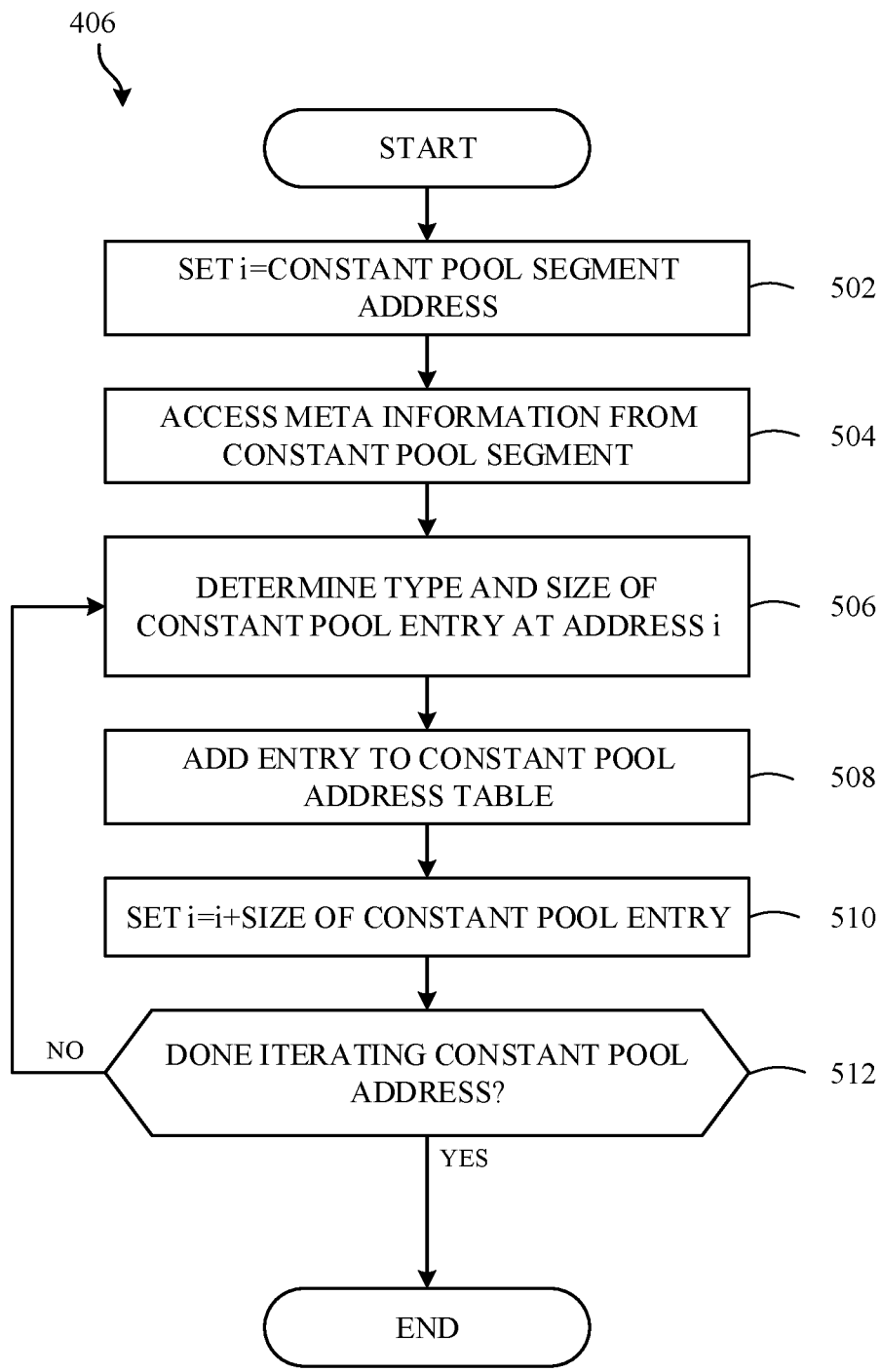
FIG. 5 is a flowchart representative of example machine-readable instructions which may be executed to implement the example instruction analyzer of FIG. 2 to generate a constant pool address table.

FIG. 5 is a flowchart representative of example machine readable instructions which may be executed to implement the example instruction analyzer 106 of FIG. 2 to generate a constant pool address through an iterative process. The example process 406 of the illustrated example of FIG. 5 begins when the constant pool address generator 212 sets a constant pool segment address to a temporary address, in this example, i. (Block 502). Meta information is accessed from the constant pool segment at the temporary address i (e.g., block 504) and the constant pool address generator 212 determines the type and size of the file features (Block 506).

The file features are added to the constant pool address table by the constant pool address generator 212 according to the discovered constant pool type. (Block 508). The constant pool generator 212 increments the address i by the size of each new entry. (Block 510). If there are more features to be added to the constant pool address table once the address has been incremented (e.g., block 512 returns a result of NO), the constant pool address generator 212 determines the type and size of the file features at the newly incremented address i. Once the file features have been added to the constant pool address table (e.g., block 512 returns the result YES), the constant pool address generator 212 terminates the example process 406 of FIG. 5.

Figure 6:
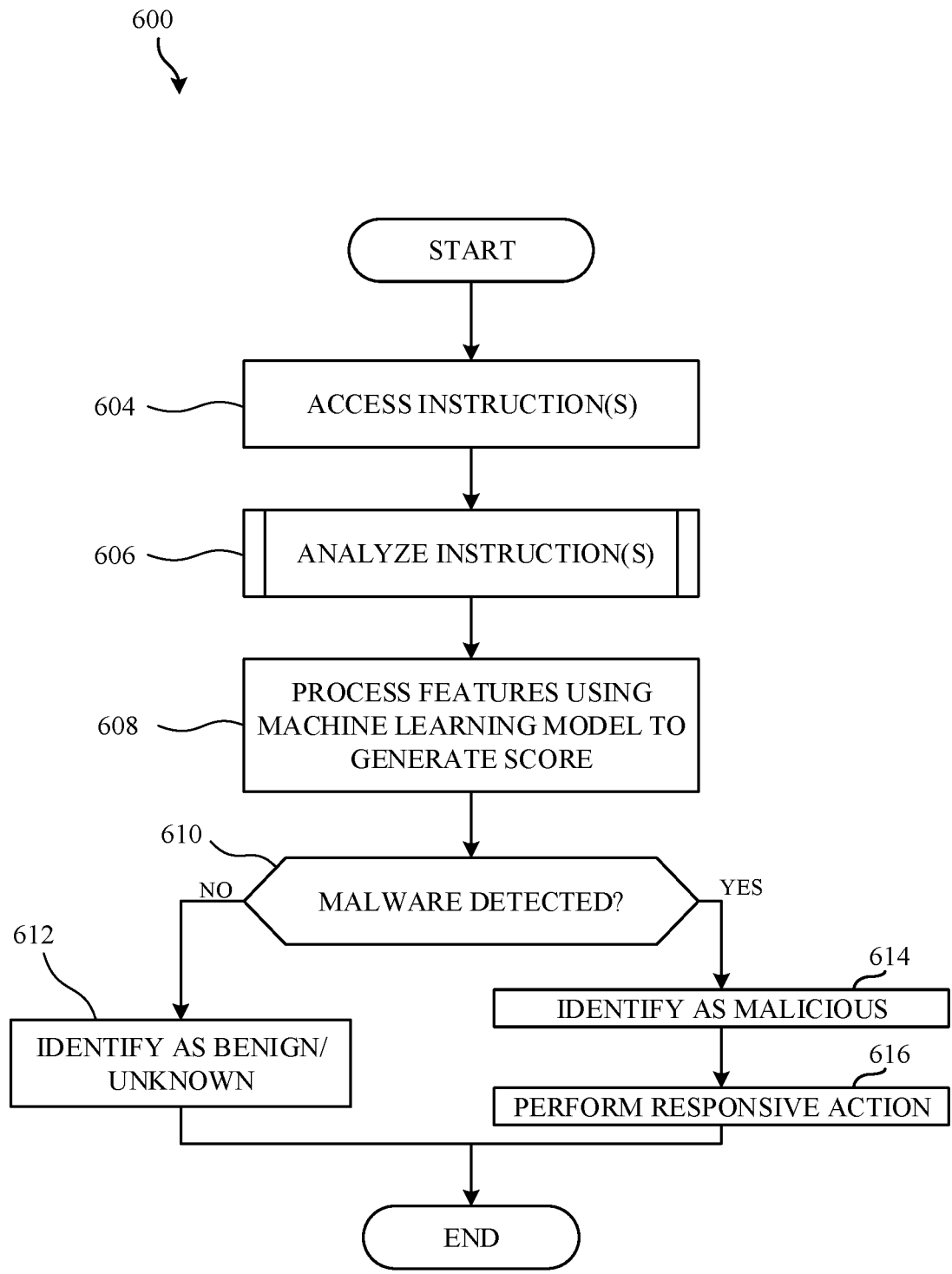
FIG. 6 is a flowchart representative of example machine-readable instructions which may be executed to implement the example instruction analyzer of FIG. 2 to process and classify unknown JAR/class files from determined thresholds.

FIG. 6 is a flowchart representative of example machine readable instructions which may be executed to implement the example machine learning model processor 222 of FIG. 2 to classify unknown instructions and label those instructions as benign, malicious, or unknown. The example process of FIG. 6 may be executed as part of a file and/or system scan, may be executed in response to execution (and/or a request to execute) an instruction file (e.g., a JAR file), may be executed in response to a user request, etc. The example process 600 of the illustrated example of FIG. 6 begins when the machine learning model processor 222 accesses instructions (e.g., a JAR file) to be analyzed. (Block 604). The instruction analyzer 106 analyzes the accessed instructions and produces an instruction feature matrix. (Block 606). An example approach for implementing the analysis of the instructions to generate the feature matrix is described above in connection with FIG. 3. The machine learning model processor 222 processes the instruction feature matrix using a machine learning model stored in the machine learning model memory 226 to generate a score. (Block 608). In examples disclosed herein, the score indicates whether the instructions associated with the feature matrix are malicious, benign, etc. Training of the model used by the machine learning model processor 222 is described in further detail below in connection with FIG. 7.

Upon generation of the score by the machine learning model processor 222, the malware remediator 230 determines whether malware has been detected. (Block 610). In some examples, malware is detected when the generated score meets or exceeds a threshold confidence score (e.g., a 70% likelihood that the data is malware). If malware has not been detected (e.g., block 610 returns a result of NO), the malware remediator 230 identifies the accessed instructions as benign (or unknown). (Block 612). In some examples, a record of the classification of the instructions is stored. Storing a record may, in some examples, enable future requests for a classification of the instructions to be replied to without the need to re-process the instructions using the example process of FIG. 6. The example process 600 of FIG.

6 then terminates, but may be re-executed in connection with subsequent requests to analyze instructions.

If malware has been detected (e.g., block 610 returns a result of YES), the example malware remediator 230 identifies the instructions as malicious (Block 614), and performs a responsive action. (Block 616). In some examples, malware is detected when a confidence score meets or exceeds the threshold confidence score (e.g., a 70% likelihood that the data is malware). In examples disclosed herein, the responsive action performed by the example malware remediator 230 (at block 616), may include deleting the instructions data, quarantining the instructions (e.g., preventing execution of the instructions), alerting a user, alerting a system administrator, etc.

Figure 7:
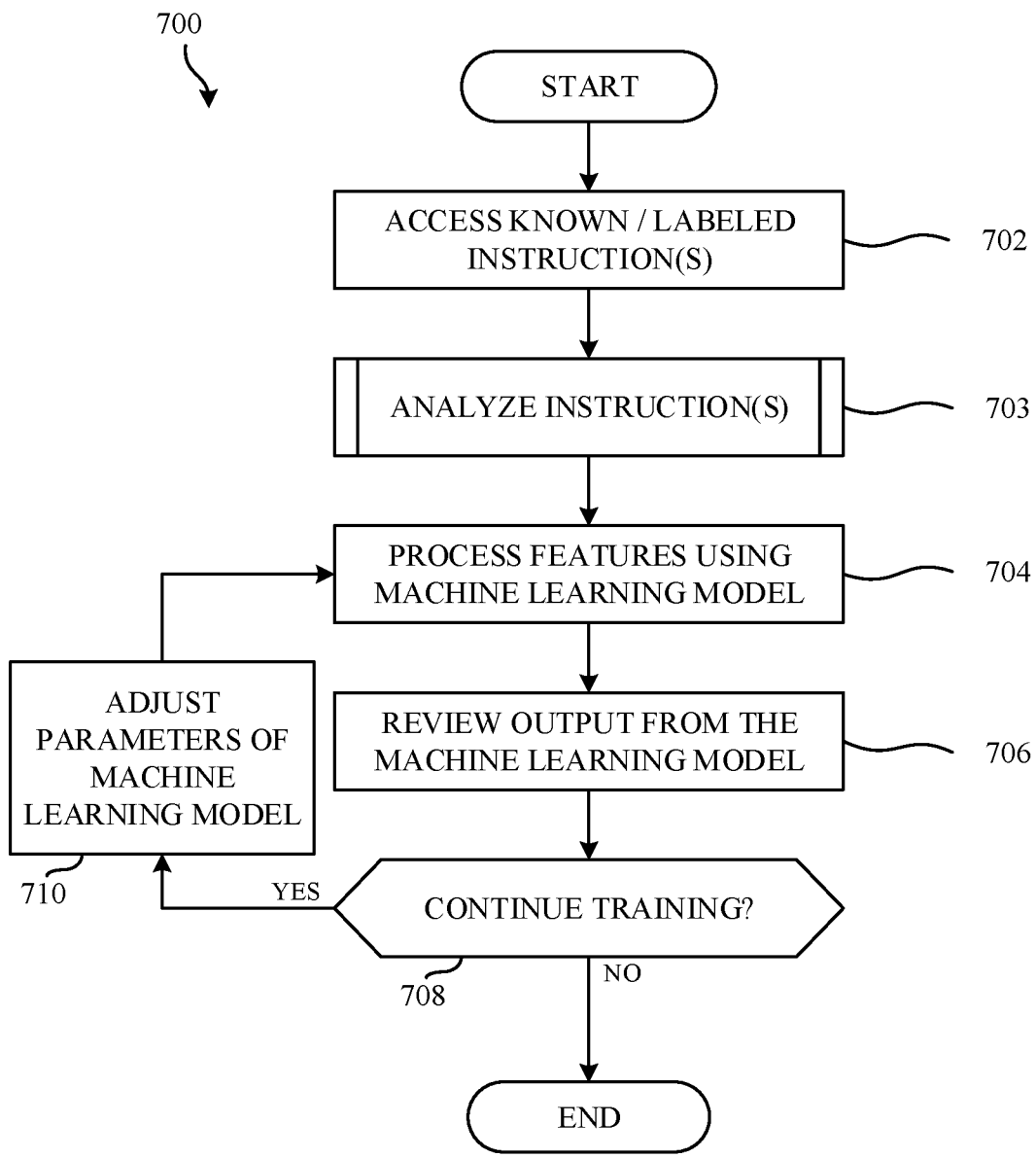
FIG. 7 is a flowchart representative of example machine-readable instructions which may be executed to implement the example instruction analyzer of FIG. 2 to train a machine learning model and develop malware detection thresholds.

FIG. 7 is a flowchart representative of example machine readable instructions which may be executed to implement the example machine learning model trainer 224 of FIG. 2 to train a machine learning model using labeled instructions. The example process 700 of the illustrated example of FIG. 7 begins when the machine learning model trainer 224 accesses the labeled instructions. (Block 702). The instruction analyzer 106 then analyzes the known instructions and generates a feature matrix corresponding to each instruction. (Block 703). An example approach for implementing the analysis of the instructions is described above in connection with FIG. 3. In examples disclosed herein, a feature matrix is created for each labeled instruction set.

The machine learning model trainer 224 causes the machine learning model processor 222 to process the feature matrices for the labeled instructions using a machine learning model. (Block 704). In examples disclosed herein, the model is stored in the machine learning model memory 226. In some examples, (e.g., when first training a machine learning model) the model is initialized by the machine learning model trainer 224. In some examples, the model may be initialized by contacting the central server 130 to obtain an initial model, enabling further training to be performed more efficiently at the instruction analyzer 106.

The example machine learning model trainer 224 reviews the output of the machine learning model processor 222 to determine an amount of error of the machine learning model. (Block 706). For example, the machine learning model trainer 224 reviews the outputs of the machine learning model processor 222 to determine whether the outputs from the model, when processing the feature matrices, match the expected malicious/benign labels included in the training data. That is, an amount of error of the model is calculated to quantify the accuracy of the model.

The example machine learning model trainer 224 determines whether to continue training. (Block 708). In examples disclosed herein, the example machine learning model trainer 224 determines whether to continue training based on whether the calculated amount of error meets or exceeds a threshold amount of error. For example, training may be performed until, for example, the calculated amount of error is below the threshold amount of error. To continue training (e.g., in response to block 708 returning a result of YES), the example machine learning model trainer 224 adjusts parameters of the machine learning model stored in the machine learning memory 226. (Block 710). In some examples, the amount of adjustment to the parameters of the machine learning model is based on the calculated amount of error. Control then proceeds to block 704, where the process of blocks 704 through 708 is repeated until the calculated amount of error is less than the threshold amount of error (e.g., until block 708 returns a result of NO). The example process 700 of FIG. 7 then terminates, but may be later re-executed to perform subsequent training.

Figure 8:
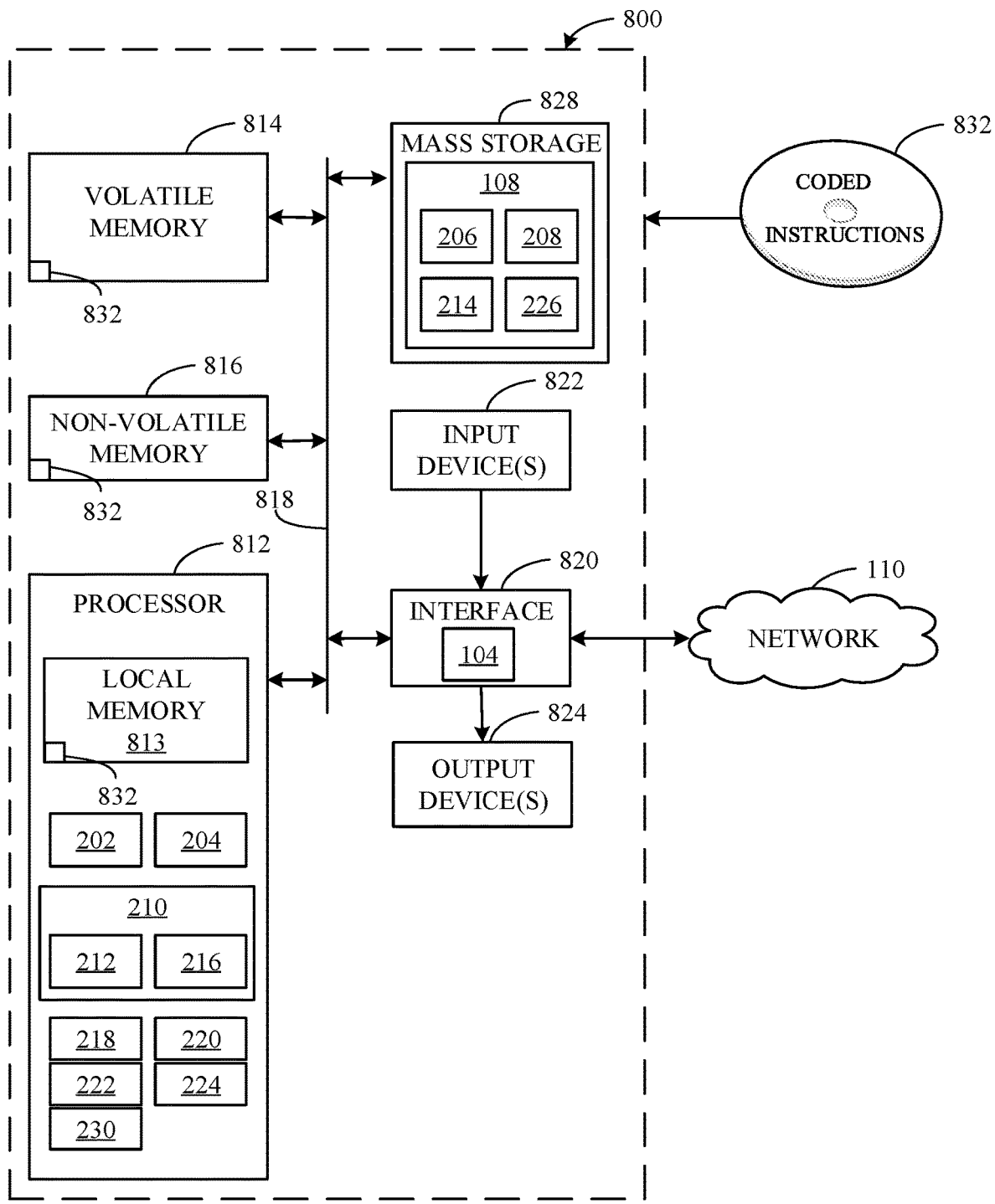
FIG. 8 is a block diagram of an example processor platform structured to execute the instructions of FIGS. 3, 4, 5, 6, and/or 7 to implement the JAR/class file decompilation system of FIG. 1.

FIG. 8 is a block diagram of an example processor platform 800 structured to execute the instructions of FIGS. 3, 4, 5, 6 and/or 7 to implement the instruction analyzer 106 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example instruction accessor 202, the example file extractor 204, the example class feature unpacker 210, the example constant pool address generator 212, the example class feature identifier 216, the example feature value identifier 218, the example feature matrix generator 220, the example machine learning model processor 222, the example machine learning model trainer 224, the example malware remediator 230, and/or, more generally, the example instruction analyzer 106 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, a keyboard, a button, a mouse, and/or a touchscreen.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or a printer. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 110. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3, 4, 5, 6 and/or 7 may be stored in the mass storage device 828, in the volatile memory 814, in the non-volatile memory 816, and/or on a removable non-transitory computer readable storage medium such as a CD or DVD. In the illustrated example of FIG. 8, the example mass storage device 828 implements the example instruction datastore 108, the example non-class file storage 206, the example class file storage 208, the example class feature storage 214, and/or the example machine learning model memory 226.

From the foregoing, it will be appreciated that example methods, apparatus and articles of manufacture have been disclosed that enable malware detection using instruction file decompilation. The disclosed methods, apparatus and articles of manufacture improve the efficiency of using a computing device by enabling a faster detection of JAR/class file malware using JAR/class file decompilation. In this manner, malware can be detected orders of magnitude faster than current tools and allows for real-time use. The disclosed methods, apparatus and articles of manufacture are accordingly directed to one or more improvement(s) in the functioning of a computer.

Example methods and apparatus to detect malware using JAR file decompilation are disclosed herein. Further examples and combinations thereof include the following:

Example 1 includes an apparatus for decompiling class files, the apparatus comprising a class feature unpacker to unpack a class feature from a class file included in an instruction set, a constant pool address generator to generate a constant pool address table, from the class features, including a plurality of constant pool blocks, based on constant pool type, through an iterative process, a class feature identifier to determine values for each constant pool block based on a constant pool type and store the determined values as a class file feature set, a feature value identifier to obtain raw feature values from a class file feature set and non-class file features, and a feature matrix generator to generate a matrix based on the raw features that correspond to the instruction set.

Example 2 includes the apparatus of example 1, wherein the instruction set represents a Java ARchive (JAR) file and further including a file extractor to extract the class and non-class files from the JAR file.

Example 3 includes the apparatus of example 2, further including a non-class file storage device to store non-class file features extracted from the instruction set by the file extractor.

Example 4 includes the apparatus of example 2, further including a class file storage device to store class files extracted from the instruction set by the file extractor.

Example 5 includes the apparatus of example 1, further including a machine learning model trainer to train a machine learning model based on generated matrices and a threshold value.

Example 6 includes the apparatus of example 5, further including a machine learning model processor to apply the machine learning model to the matrix to determine whether a second instruction set is malicious.

Example 7 includes the apparatus of example 1, further including a class feature storage device to store class file feature values as class file feature sets.

Example 8 includes at least one non-transitory computer-readable medium comprising instructions that, when executed, cause at least one processor to at least unpack a class feature from a class file included in an instruction set, generate a constant pool address table, from the class features, including a plurality of constant pool blocks, based on constant pool type, through an iterative process, determine values for each constant pool block based on constant pool type and store the determined values as a class file feature set, obtain raw feature values from a class file feature set and non-class file features, and generate a matrix based on raw features that correspond to the instruction set.

Example 9 includes the at least one non-transitory computer-readable medium of example 8, wherein the instruction set represents a Java ARchive (JAR) file and the instructions, when executed, cause the at least one processor to extract class and non-class files from the JAR file.

Example 10 includes the at least one non-transitory computer-readable medium of example 9, wherein the instructions, when executed, cause the at least one processor to store non-class file features extracted from the instruction set.

Example 11 includes the at least one non-transitory computer-readable medium of example 9, wherein the instructions, when executed, cause the at least one processor to store class files extracted from the instruction set.

Example 12 includes the at least one non-transitory computer-readable medium of example 8, wherein the instructions, when executed, cause the at least one processor to train a machine learning model based on generated matrices and a threshold value.

Example 13 includes the at least one non-transitory computer-readable medium of example 8, wherein the instructions, when executed, cause the at least one processor to apply a machine learning model to the matrix to determine whether a second instruction set is malicious.

Example 14 includes the at least one non-transitory computer-readable medium of example 8, wherein the instructions, when executed, cause the at least one processor to store class file feature values as class file feature sets.

Example 15 includes an apparatus for decompiling class files, the apparatus comprising means for unpacking a class feature from a class file included in an instruction set, means for generating a constant pool address table, from the class features, including a plurality of constant pool blocks, based on constant pool types, through an iterative process, means for determining values for each constant pool block based on a constant pool type and storing the determined values as a class file feature set, means for obtaining raw feature values from a class file feature set and non-class file features, and means for generating a matrix based on the raw features that correspond to the instruction set.

Example 16 includes the apparatus of example 15, wherein the instruction set represents a Java ARchive (JAR) file, and further including means for extracting the class and non-class files from the JAR file.

Example 17 includes the apparatus of example 16, further including means for storing non-class file features extracted from the instruction set.

Example 18 includes the apparatus of example 16, further including means for storing class files extracted from the instruction set.

Example 19 includes the apparatus of example 15, further including means for training a machine learning model based on generated matrices and a threshold value.

Example 20 includes the apparatus of example 19, further including means for applying the machine learning model to the matrix to determine whether a second instruction set is malicious.

Example 21 includes the apparatus of example 15, further including means for storing class file feature values as class file feature sets.

Example 22 includes a method for decompiling class files, the method comprising unpacking a class feature from a class file included in an instruction set, generating a constant pool address table, from the class features, containing a plurality of constant pool blocks, based on constant pool type, through an iterative process, determining values for each constant pool block, by executing an instruction with a processor, based on a constant pool type and store the determined values as a class file feature set, obtaining raw feature values from a class file feature set and non-class file features, and generating a matrix based on the obtained raw features that correspond to the instruction set.

Example 23 includes the method of example 22, wherein the instruction set represents a Java ARchive (JAR) file and further including extracting the class and non-class files from the JAR file.

Example 24 includes the method of example 23, further including storing non-class file features extracted from the instruction set.

Example 25 includes the method of example 23, further including storing class files extracted from the instruction set.

Example 26 includes the method of example 22, further including training a machine learning model based on generated matrices and a threshold value.

Example 27 includes the method of example 26, further including applying the machine learning model to the matrix to determine whether a second instruction set is malicious.

Example 28 includes the method of example 22, further including storing class file feature values as class file feature sets.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for decompiling class files, the apparatus comprising:
    a class feature unpacker to unpack one or more class features from a class file included in an instruction set;
    a constant pool address generator to:
        initialize a temporary address corresponding to one of the one or more class features;
        read metadata from the temporary address, the metadata corresponding to constant pool information;
        generate a constant pool address table using metadata corresponding to the constant pool information, the constant pool address table to include a plurality of blocks of constant pool information; and
    a feature matrix generator to generate a matrix of features based on the plurality of blocks of constant pool information, the features to represent the instruction set.

2. The apparatus of claim 1, wherein the instruction set represents a Java ARchive (JAR) file and further including a file extractor to extract class files and non-class files from the JAR file.

3. The apparatus of claim 2, further including a non-class file storage device to store features of the non-class files extracted from the instruction set by the file extractor.

4. The apparatus of claim 2, further including a class file storage device to store the class files extracted from the instruction set by the file extractor.

5. The apparatus of claim 1, further including a machine learning model trainer to train a machine learning model based on matrices of features and a threshold value.

6. The apparatus of claim 5, further including a machine learning model processor to apply the machine learning model to the matrix of features to determine whether the instruction set is malicious.

7. The apparatus of claim 1, further including a class feature storage device to store class file feature values as class file feature sets, the class file feature values corresponding to values of the plurality of blocks of constant pool information.

8. At least one non-transitory computer-readable medium comprising instructions that, when executed, cause at least one processor to at least:
    unpack one or more class features from a class file included in an instruction set;
    initialize a temporary address corresponding to one of the one or more class features;
    read metadata from the temporary address, the metadata corresponding to constant pool information;
    generate a constant pool address table using metadata corresponding to the constant pool information, the constant pool address table to include a plurality of blocks of constant pool information; and
    generate a matrix of features based on plurality of blocks of constant pool information, the features to represent the instruction set.

9. The at least one non-transitory computer-readable medium of claim 8, wherein the instruction set represents a Java ARchive (JAR) file and the instructions, when executed, cause the at least one processor to extract class files and non-class files from the JAR file.

10. The at least one non-transitory computer-readable medium of claim 9, wherein the instructions, when executed, cause the at least one processor to store features of the non-class files extracted from the instruction set.

11. The at least one non-transitory computer-readable medium of claim 9, wherein the instructions, when executed, cause the at least one processor to store the class files extracted from the instruction set.

12. The at least one non-transitory computer-readable medium of claim 8, wherein the instructions, when executed, cause the at least one processor to train a machine learning model based on matrices of features and a threshold value.

13. The at least one non-transitory computer-readable medium of claim 8, wherein the instructions, when executed, cause the at least one processor to apply a machine learning model to the matrix of features to determine whether the instruction set is malicious.

14. The at least one non-transitory computer-readable medium of claim 8, wherein the instructions, when executed, cause the at least one processor to store class file feature values as class file feature sets, the class file feature values corresponding to values of the plurality of blocks of constant pool information.

15. An apparatus for decompiling class files, the apparatus comprising:
  means for unpacking one or more class features from a class file included in an instruction set;
  means for generating a constant pool address table to:
    initialize a temporary address corresponding to one of the one or more class features;
    read metadata from the temporary address, the metadata corresponding to constant pool information;
    generate the constant pool address table using metadata corresponding to the constant pool information, the constant pool address table to include a plurality of blocks of constant pool information; and
  means for generating a matrix of features based on the plurality of blocks of constant pool information, the features to represent the instruction set.

16. The apparatus of claim 15, wherein the instruction set represents a Java ARchive (JAR) file, and further including means for extracting class files and non-class files from the JAR file.

17. The apparatus of claim 16, further including means for storing features of the non-class files extracted from the instruction set.

18. The apparatus of claim 16, further including means for storing the class files extracted from the instruction set.

19. The apparatus of claim 15, further including means for training a machine learning model based on matrices of features and a threshold value.

20. The apparatus of claim 19, further including means for applying the machine learning model to the matrix of features to determine whether the instruction set is malicious.

* * * * *